J. B. SPEED & A. E. WRIGHT.
LIQUID METER.
APPLICATION FILED MAY 15, 1908.

918,097.                                Patented Apr. 13, 1909.

WITNESSES.

INVENTORS.
James Buckner Speed
and Albert Eugene Wright
by Wm F. Booth
their Attorney

UNITED STATES PATENT OFFICE.

JAMES BUCKNER SPEED AND ALBERT EUGENE WRIGHT, OF BERKELEY, CALIFORNIA.

LIQUID-METER.

No. 918,097.  Specification of Letters Patent.  Patented April 13, 1909.

Application filed May 15, 1908. Serial No. 432,998.

*To all whom it may concern:*

Be it known that we, JAMES BUCKNER SPEED and ALBERT EUGENE WRIGHT, citizens of the United States, residing at Berkeley, in the county of Alameda and State of California, have invented certain new and useful Improvements in Liquid-Meters, of which the following is a specification.

Our invention relates to the class of liquid-meters. It is primarily intended for measuring the amount of water flowing in irrigation ditches, though it is equally applicable for measuring paper-pulp or any other substance flowing in a trough or flume.

The object of our invention is to provide a simple, economical and efficient meter, capable of easy application; and, to this end, our invention consists in the novel meter which we shall hereinafter fully describe, by reference to the accompanying drawings in which—

Figure 1:
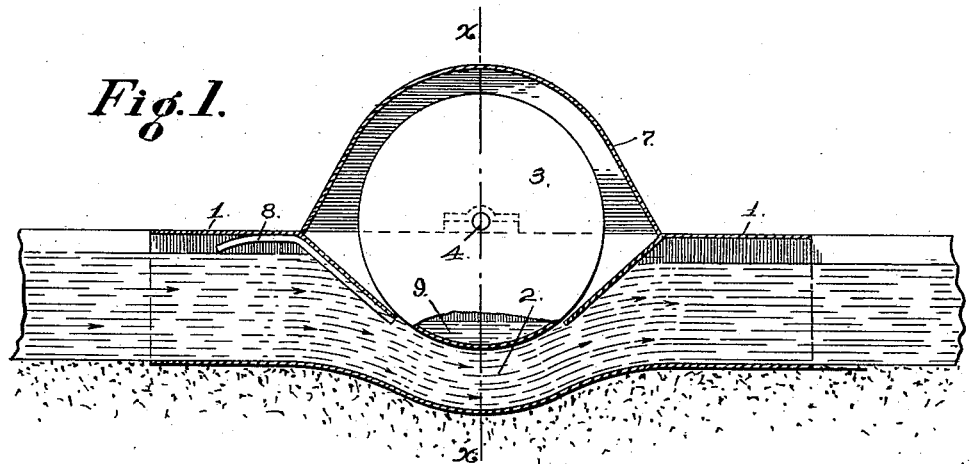
Figure 2:
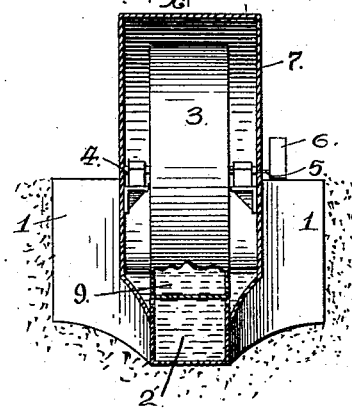
Figure 3:
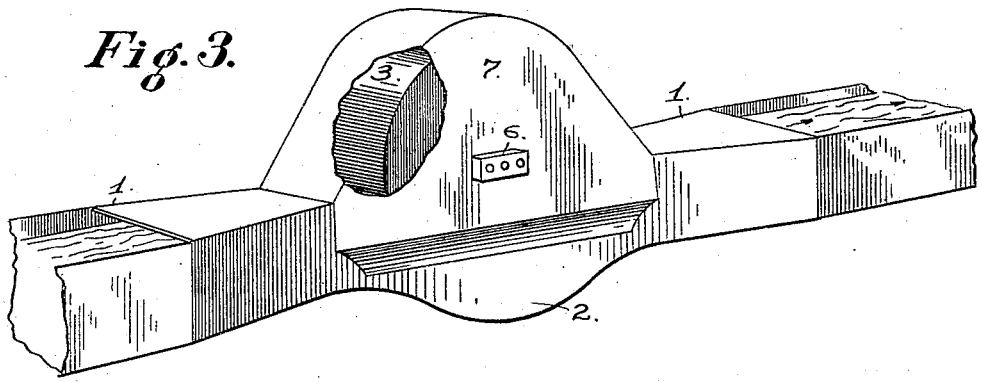

Figure 1 is a longitudinal section, showing the application of our meter to an irrigating ditch. Fig. 2 is a cross section on line $x—x$ of Fig. 1. Fig. 3 is a perspective view, partly broken.

1 is a ditch or flume. At a suitable point in this is made a curved conduit 2, through which all the water passes; the capacity and arrangement of the conduit being such that it is always full. The conduit 2 has a portion of its bounding wall or wetted perimeter made movable, a result reached in the present illustrated form by cutting away or omitting a part of the fixed wall and replacing it with the rim of a drum 3. The drum 3 is mounted on an axle 4, and the number of its revolutions may be registered in any suitable manner. For the sake of illustration we show a shaft 5 extending from the axle and connected with a registering device 6. By the water flowing through the conduit 2, the drum is dragged around, and from the number of its registered revolutions, the amount of water passing through the conduit may be known. The drum is housed in and is only partially immersed in the water in said housing, so that a body of air is kept in the housing.

7 is an air-tight housing inclosing the drum, and 8 is a pipe leading from the exterior down into the conduit and terminating near where the drum-rim forms the movable part of the wetted perimeter of said conduit. By arranging the outer end of this pipe in such proximity to the water in the ditch that occasionally some water will splash into it, enough air can be entrained to replenish the air body in the drum, and keep the water level in the housing constant. In some cases it is desirable to use bearings for the drum of but little delicacy, and in such cases the meter would register low at small water flow and high at large water flow. To remedy this we put inside the drum a small body of water or other liquid 9, which will offer a resistance about proportional to the square of the rotative speed, and thereby correct the above mentioned error at high speed.

In this meter the rim of the drum forms part of the wall of the conduit, and said drum is kept out of the water, except where it forms said part of the wall. It, therefore, offers no obstruction, will not catch sticks, stones, grass, and other foreign substances in the water. The friction of its turning is so small that its speed of rotation is, within practical limits, proportional to the rate of the flow through the conduit. The deposition of silt, sand, etc., is prevented by the relatively high velocity through the conduit. Finally, there is the smallest possible loss of head, that is to say, the smallest possible difference in the levels of the ditch entering and leaving the conduit.

Having thus described our invention, what we claim as new and desire to secure by Letters Patent is:—

1. A liquid-meter comprising a conduit; a revoluble member forming a portion of the wetted perimeter of the conduit, said member being turned by the flow of the liquid through said conduit; an air-tight housing inclosing said revoluble member; means for replenishing the air in said housing; and means for registering the revolutions of said member.

2. A liquid-meter comprising a conduit; a rotatable drum an arc of the rim of which forms a portion of the wetted perimeter of the conduit; an air-tight housing inclosing said drum; means for replenishing the air in said housing; and means for registering the revolutions of said drum.

3. A liquid-meter comprising a conduit; a rotatable, hollow drum, the rim of which forms, under the action of the flowing liquid, a moving portion of the wetted perimeter of the conduit, said drum containing a small body of liquid; an air-tight housing inclosing said drum; means for replenishing the air in said housing, and means for registering the revolutions of the drum.

In testimony whereof we have signed our names to this specification in the presence of two subscribing witnesses.

JAMES BUCKNER SPEED.
ALBERT EUGENE WRIGHT.

Witnesses:
PERRY T. TOMPKINS,
JOHN HENDERSON.